United States Patent

Fujita

(10) Patent No.: US 9,506,393 B2
(45) Date of Patent: Nov. 29, 2016

(54) MUFFLER UNIT AND VEHICLE INCLUDING THE SAME

(71) Applicant: YAMAHA HATSUDOKI KABUSHIKI KAISHA, Iwata-shi, Shizuoka (JP)

(72) Inventor: Masato Fujita, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 0 days.

(21) Appl. No.: 14/716,911

(22) Filed: May 20, 2015

(65) Prior Publication Data

US 2015/0377113 A1    Dec. 31, 2015

(30) Foreign Application Priority Data

Jun. 26, 2014 (JP) ................ 2014-131733

(51) Int. Cl.
| | |
|---|---|
| *B60K 13/04* | (2006.01) |
| *F01N 13/08* | (2010.01) |
| *F01N 1/08* | (2006.01) |
| *B60K 5/00* | (2006.01) |

(52) U.S. Cl.
CPC ............ *F01N 13/082* (2013.01); *B60K 13/04* (2013.01); *F01N 1/083* (2013.01); *F01N 1/089* (2013.01); *B60K 2005/003* (2013.01); *B60Y 2200/124* (2013.01); *F01N 2470/02* (2013.01); *F01N 2470/18* (2013.01); *F01N 2490/04* (2013.01)

(58) Field of Classification Search
CPC ...... F01N 13/082; F01N 13/08; F01N 1/089; F01N 13/1838; F01N 13/185; B60K 13/04; B60Y 2200/124; E02F 9/0866
USPC ................ 181/227, 272, 269, 229, 231
See application file for complete search history.

(56) References Cited

U.S. PATENT DOCUMENTS

| | | | | |
|---|---|---|---|---|
| 3,749,199 A | * | 7/1973 | Weber | F01N 1/084 181/236 |
| 3,968,854 A | * | 7/1976 | Gordon | B60K 13/04 180/68.1 |
| 4,011,922 A | * | 3/1977 | Goplen | F01N 1/02 181/272 |
| 4,388,804 A | * | 6/1983 | Bushmeyer | F01N 13/082 123/41.64 |
| 4,501,341 A | * | 2/1985 | Jones | F01N 1/006 181/250 |
| 5,365,025 A | * | 11/1994 | Kraai | F01N 1/006 181/249 |
| 5,373,119 A | * | 12/1994 | Suzuki | F01N 1/08 181/230 |
| 6,220,387 B1 | * | 4/2001 | Hoppes | F01N 1/14 181/227 |
| 6,457,551 B1 | * | 10/2002 | Chang | F01N 1/003 181/242 |
| 6,499,561 B1 | * | 12/2002 | Yasuda | B60K 13/04 181/227 |
| 8,083,026 B1 | * | 12/2011 | Butler | F01N 1/083 181/212 |
| 8,151,932 B2 | * | 4/2012 | Inoue | F01N 13/08 181/227 |
| 8,596,405 B2 | | 12/2013 | Sunsdahl et al. | |
| 9,238,989 B2 | * | 1/2016 | Tsuchihashi | B60K 13/04 |
| 2006/0270503 A1 | * | 11/2006 | Suzuki | F16H 57/0489 474/144 |
| 2013/0333357 A1 | * | 12/2013 | Nagata | F01N 13/08 60/282 |
| 2014/0202785 A1 | * | 7/2014 | Hanashima | B60K 13/04 180/309 |
| 2015/0041237 A1 | * | 2/2015 | Nadeau | B60K 5/00 180/292 |
| 2015/0300234 A1 | * | 10/2015 | Hirukawa | B60K 13/04 180/309 |

* cited by examiner

*Primary Examiner* — John Walters
*Assistant Examiner* — Brian Swenson
(74) *Attorney, Agent, or Firm* — Keating and Bennett, LLP (57) ABSTRACT

A muffler unit configured to be attached to a vehicle includes a first exhaust pipe. The muffler unit includes a muffler and a second exhaust pipe. The muffler includes a first main body preferably having a tubular shape and including a first support with a first opening and a second support with a second opening, and a first lid. The first and second openings are oriented in a radial direction of the first main body. The second exhaust pipe includes a second main body, a second lid covering a right end of the second main body, and an exhaust inlet disposed in a left end of the second main body. The second exhaust pipe extends into the first and second openings and is supported by the first and second supports. The second main body includes a communication port in communication with an inner space of the first main body.

9 Claims, 8 Drawing Sheets

MUFFLER UNIT AND VEHICLE INCLUDING THE SAME

This application claims priority to Japanese Patent Application No. 2014-131733 filed in Japan on Jun. 26, 2014, the entire contents of which are hereby incorporated by reference.

BACKGROUND OF THE INVENTION

1. Field of the Invention

The present invention relates to muffler units and vehicles including the muffler units.

2. Description of the Related Art

Vehicles that include engines are conventionally provided with mufflers to reduce exhaust noise associated with discharge of exhaust gas from the engines. The engine and muffler of such a vehicle are connected to each other through an exhaust pipe. For example, when the muffler has a cylindrical shape, the exhaust pipe may be connected to the muffler in an axial direction of the muffler or in a radial direction of the muffler so that the muffler supports the exhaust pipe.

Examples of such a vehicle include vehicles designed to be travel over rough terrain. Among these vehicles are a recreational off-highway vehicle (hereinafter referred to as an "ROV") and a side-by-side all terrain vehicle (ATV). Because such a vehicle is subject to strict constraints of the installation space for the muffler and the exhaust pipe, the exhaust pipe is often connected to the muffler in the radial direction of the muffler. When such a vehicle travels over rough terrain, the engine, exhaust pipe, and muffler of the vehicle vibrate more strongly than when the vehicle travels over flat terrain. For example, U.S. Pat. No. 8,596,405 discloses a vehicle including an engine; a first exhaust pipe connected to the engine; a second exhaust pipe connected to the first exhaust pipe; and a muffler connected to the second exhaust pipe. The second exhaust pipe and the muffler define a muffler unit. In the muffler unit, the second exhaust pipe is connected to the muffler in a radial direction of the muffler.

In the vehicle disclosed in U.S. Pat. No. 8,596,405, the second exhaust pipe is connected to the muffler in the radial direction of the muffler at a single position. In other words, the muffler supports the second exhaust pipe at the single position. The vehicle traveling over rough terrain causes the second exhaust pipe and the muffler to vibrate, or causes one of the second exhaust pipe and the muffler to vibrate when the other of the second exhaust pipe and the muffler is secured. In this case, stress caused by such vibrations concentrates at the connection between the second exhaust pipe and the muffler. This unfortunately creates the need for a robust structure to reduce distortion that occurs in the connection due to the stress.

SUMMARY OF THE INVENTION

Accordingly, preferred embodiments of the present invention provide a muffler unit having a simple structure that enables a muffler to reliably support an exhaust pipe, and significantly reduces or prevents stress-induced distortion that occurs at connections between the muffler and the exhaust pipe when the muffler and/or the exhaust pipe vibrate(s).

A muffler unit according to a preferred embodiment of the present invention is configured to be attached to a vehicle including an engine and a first exhaust pipe through which exhaust gas discharged from the engine flows. The muffler unit includes a muffler and a second exhaust pipe. The muffler includes a first main body having a tubular or substantially tubular shape and including a first support provided with a first opening oriented in a radial direction of the first main body, and a second support provided with a second opening oriented in the radial direction of the first main body; a first lid covering a first end of the first main body; and an exhaust outlet disposed in a second end of the first main body. The second exhaust pipe includes a second main body having a tubular or substantially tubular shape; a second lid covering a first end of the second main body; and an exhaust inlet disposed in a second end of the second main body and connected to the first exhaust pipe. The second exhaust pipe extends into the first and second openings and is supported by the first and second supports. The second main body includes a communication port through which an inner space of the first main body and an inner space of the second main body are in communication with each other.

In the muffler unit according to the present preferred embodiment of the present invention, the second exhaust pipe, which is connected to the first exhaust pipe, extends into the first and second openings of the first main body and is thus supported at two positions by the first and second supports of the first main body. Thus, the second exhaust pipe and the muffler are fixed to each other more reliably than when the second exhaust pipe is supported at one position by the first main body. This connection consequently reduces or prevents stress-induced distortion that occurs in the connections between the muffler and the second exhaust pipe, i.e., in the first and second supports, when the muffler and/or the second exhaust pipe vibrate(s).

According to another preferred embodiment of the present invention, an axis of the second main body is preferably perpendicular or substantially perpendicular to an axis of the first main body.

This preferred embodiment enables the first main body to support the second exhaust pipe in a balanced manner at the first and second supports.

According to still another preferred embodiment of the present invention, the axis of the first main body and the axis of the second main body preferably intersect with each other.

This preferred embodiment increases the distance between the first and second supports than when the axis of the first main body and the axis of the second main body do not intersect with each other. Consequently, the second exhaust pipe is more securely supported by the first main body.

According to yet another preferred embodiment of the present invention, the first end of the second main body preferably extends outward of the first main body.

This preferred embodiment enables the first main body to support the second exhaust pipe more securely than when the first main body supports the second exhaust pipe, with the first end of the second main body not protruding from the first main body through the first or second opening.

According to still yet another preferred embodiment of the present invention, the communication port preferably includes a plurality of holes arranged along an entire circumference of the second main body.

This preferred embodiment allows exhaust gas to be discharged to the muffler through the plurality of holes. Consequently, the muffler unit effectively muffles exhaust noise.

According to another preferred embodiment of the present invention, the communication port preferably has an oblong or substantially oblong shape. The exhaust outlet and the communication port are preferably oriented in different directions.

The communication port according to this preferred embodiment has an oblong or substantially oblong shape and thus allows exhaust gas to flow efficiently from the second exhaust pipe to the muffler. Furthermore, a flow passage through which the exhaust gas flows is increased in length because the exhaust outlet and the communication port are oriented in different directions. Consequently, the muffler unit effectively muffles exhaust noise.

According to still another preferred embodiment of the present invention, the second exhaust pipe and the first main body are preferably welded to each other at the first and second supports.

The second exhaust pipe and the first main body according to this preferred embodiment are fixed to each other by welds. This further reinforces the connections between the second exhaust pipe and the first main body.

According to yet another preferred embodiment of the present invention, an axis of the second main body preferably extends horizontally or substantially horizontally.

The second exhaust pipe according to this preferred embodiment is supported by the first and second supports that are disposed symmetrically with respect to an axis of the first main body. Thus, upon application of a vertically downward load to the muffler, equal or substantially equal loads are applied to the first and second supports. Consequently, the load applied to one of the first and second supports is prevented from being greater than the load applied to the other of the first and second supports.

A vehicle according to a preferred embodiment of the present invention includes a body frame; an engine supported by the body frame; a first exhaust pipe through which exhaust gas discharged from the engine flows; and a muffler unit supported by the body frame. The muffler unit includes a muffler and a second exhaust pipe. The muffler includes a first main body having a tubular or substantially tubular shape and including a first support provided with a first opening oriented in a radial direction of the first main body, and a second support provided with a second opening oriented in the radial direction of the first main body; a first lid covering a first end of the first main body; and an exhaust outlet disposed in a second end of the first main body. The second exhaust pipe includes a second main body having a tubular or substantially tubular shape; a second lid covering a first end of the second main body; and an exhaust inlet disposed in a second end of the second main body and connected to the first exhaust pipe. The second exhaust pipe extends into the first and second openings and is supported by the first and second supports. The second main body includes a communication port through which an inner space of the first main body and an inner space of the second main body are in communication with each other.

The muffler unit of the vehicle according to this preferred embodiment is supported by the body frame. This causes the muffler unit to receive vibrations from the body frame. To cope with such vibrations, the second exhaust pipe is supported at two positions by the first and second supports of the first main body. This reduces or prevents stress-induced distortion that occurs in the connections between the muffler and the second exhaust pipe due to the vibrations.

According to another preferred embodiment of the present invention, an axis of the second main body preferably extends in a width direction of the vehicle.

The second exhaust pipe according to this preferred embodiment is supported by the first and second supports that are disposed symmetrically with respect to an axis of the first main body. Thus, upon application of a vertically downward load to the muffler, equal or substantially equal loads are applied to the first and second supports. Consequently, the load applied to one of the first and second supports is prevented from being greater than the load applied to the other of the first and second supports.

According to still another preferred embodiment of the present invention, the muffler unit is preferably disposed rearward relative to the engine, leftward relative to a right end of the engine, and rightward relative to a left end of the engine.

The muffler unit according to this preferred embodiment is compact.

According to yet another preferred embodiment of the present invention, the vehicle preferably further includes a first seat supported by the body frame; and a second seat disposed rightward of the first seat and supported by the body frame. The muffler unit is preferably disposed rightward relative to the first seat, and leftward relative to the second seat.

The muffler unit according to this preferred embodiment is compact. The muffler unit is disposed substantially in a widthwise center of the vehicle. This more effectively reduces or prevents moment-induced distortion that occurs in the first and second supports, for example, during vibration of the vehicle than when the muffler unit is offset rightward or leftward in the width direction of the vehicle.

Various preferred embodiments of the present invention provide a muffler unit having a simple structure that enables a muffler to reliably support an exhaust pipe, and reduces or prevents stress-induced distortion that occurs in the connections between the muffler and the exhaust pipe when the muffler and/or the exhaust pipe vibrate(s).

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
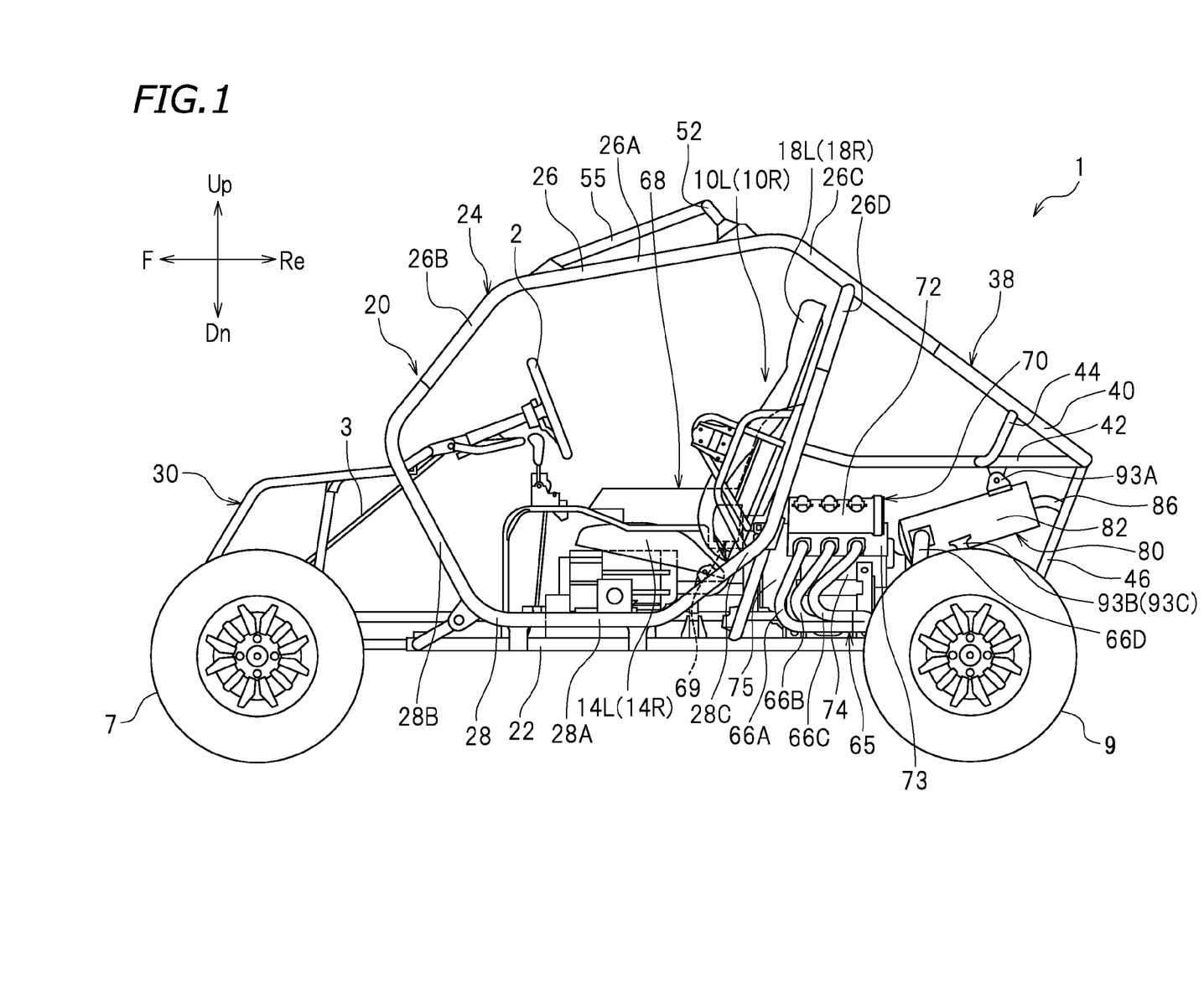
FIG. 1 is a left side view of an ROV according to a first preferred embodiment of the present invention.

Hereinafter, preferred embodiments of the present invention will be described. As illustrated in FIG. 1, a vehicle according to the present preferred embodiment is preferably a recreational off-highway vehicle (ROV) 1, for example. The ROV 1 is suitable for traveling over rough terrain. The vehicle according to the present invention is not limited to an ROV. The vehicle according to the present invention may be a motorcycle, a motor tricycle or an all terrain vehicle (ATV), for example.

Unless otherwise noted, the terms "front", "rear", "right", "left", "up", and "down" respectively refer to front, rear, right, left, up, and down with respect to an occupant sitting on a first seat portion 14L of a first seat 10L of the ROV 1 in the following description. The terms "up" and "down" respectively refer to a vertically upward direction and a vertically downward direction when the ROV 1 is stationary on a horizontal plane. Reference signs "F", "Re", "R", "L", "Up", and "Dn" in the drawings respectively represent front, rear, right, left, up, and down.

As illustrated in FIG. 1, the ROV 1 preferably includes a body frame 20; the first seat 10L; a second seat 10R; an engine 70; a muffler unit 80; right and left front wheels 7; and right and left rear wheels 9.

The body frame 20 is preferably a pipe frame. The body frame 20 preferably includes a main frame 22 extending in a front-rear direction of the vehicle; a center frame 24 disposed above the main frame 22; a front frame 30 disposed in front of the center frame 24; and a rear frame 38 disposed behind the center frame 24.

The center frame 24 preferably includes upper center frames 26 and lower center frames 28. The upper center frames 26 are disposed above the lower center frames 28. Each upper center frame 26 is connected to the associated lower center frame 28. Each upper center frame 26 preferably includes a first portion 26A extending substantially in the front-rear direction of the vehicle; a second portion 26B extending obliquely downward and forward from a front end of the first portion 26A; a third portion 26C extending obliquely downward and rearward from a rear end of the first portion 26A; and a fourth portion 26D extending obliquely downward and forward from a location along the third portion 26C. Each lower center frame 28 is disposed above the main frame 22. Each lower center frame 28 is connected to the main frame 22. Each lower center frame 28 preferably includes a first portion 28A extending in the front-rear direction of the vehicle; a second portion 28B extending obliquely upward and forward from a front end of the first portion 28A; and a third portion 28C extending obliquely upward and rearward from a rear end of the first portion 28A. Each first portion 28A is connected to the main frame 22. Each second portion 28B is connected to the second portion 26B of the associated upper center frame 26. Each third portion 28C is connected to the fourth portion 26D of the associated upper center frame 26.

Figure 2:
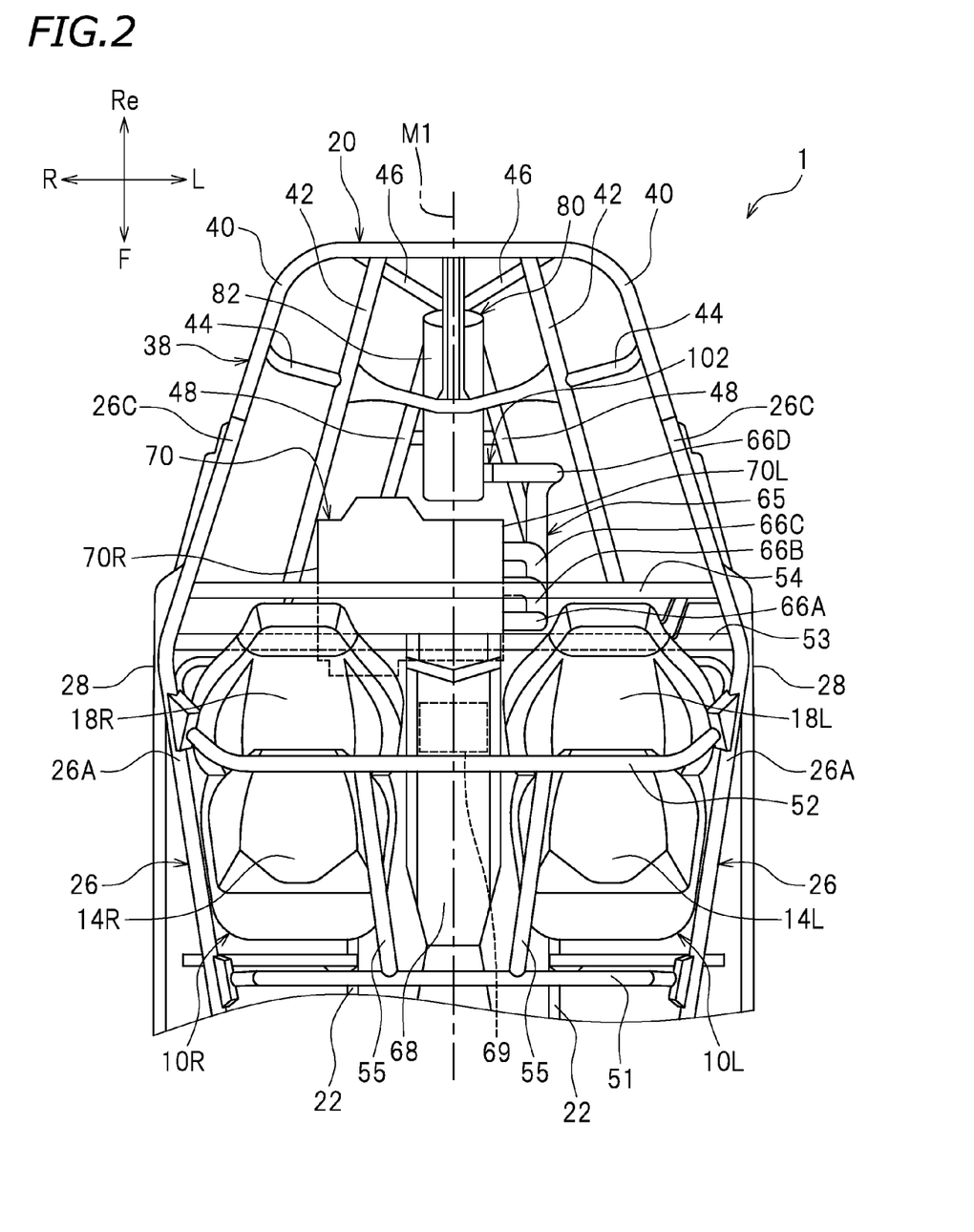
FIG. 2 is a plan view of the ROV according to the first preferred embodiment of the present invention.

As illustrated in FIG. 2, the body frame 20 preferably further includes a first cross member 51, a second cross member 52, a third cross member 53, and a fourth cross member 54. The first to fourth cross members 51 to 54 each extend in a width direction of the vehicle. The second cross member 52 is disposed rearward relative to the first cross member 51. The first and second cross members 51 and 52 connect the right and left upper center frames 26 to each other. More specifically, the first and second cross members 51 and 52 connect the right and left first portions 26A to each other. The body frame 20 preferably further includes two connection frames 55 connecting the first and second cross members 51 and 52 to each other. The connection frames 55 extend substantially in the front-rear direction of the vehicle. The third cross member 53 is disposed rearward relative to the second cross member 52. The third cross member 53 connects the right and left lower center frames 28 to each other. The fourth cross member 54 is disposed rearward relative to the third cross member 53. The fourth cross member 54 connects the right and left upper center frames 26 to each other. More specifically, the fourth cross member 54 connects the right and left fourth portions 26D (see FIG. 1) to each other. Note that the right and left rear wheels 9 are not illustrated in FIG. 2.

Figure 3:
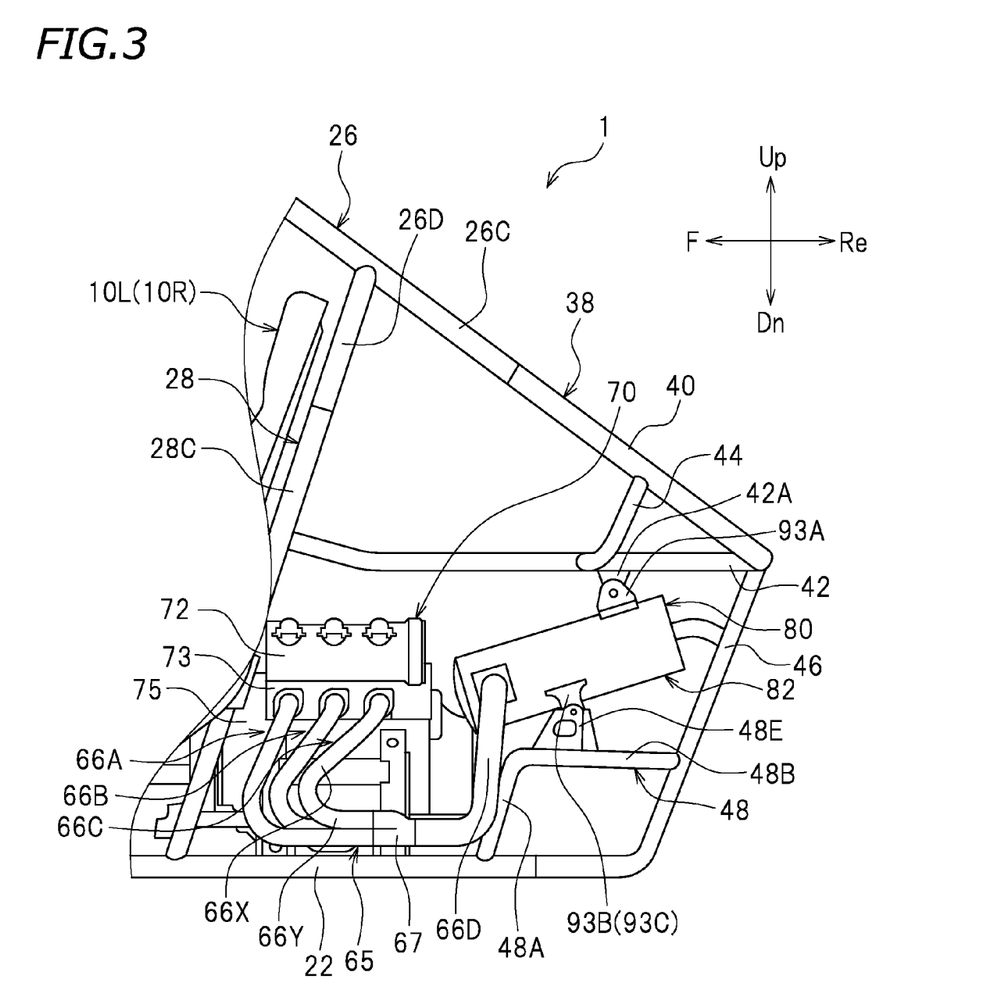
FIG. 3 is a left side view of a muffler unit according to the first preferred embodiment of the present invention and surrounding components.

As illustrated in FIG. 1, the rear frame 38 preferably includes upper rear frames 40, lower rear frames 42, first rear down frames 44, second rear down frames 46, and reinforcement frames 48 (see FIG. 3). Each upper rear frame 40 extends obliquely downward and rearward from the third portion 26C of the associated upper center frame 26. Each lower rear frame 42 extends rearward from a location along the third portion 28C of the associated lower center frame 28. A rear end of each upper rear frame 40 is connected to a rear end of the associated lower rear frame 42. Each first rear down frame 44 extends obliquely downward and forward from a location along the associated upper rear frame 40. Each first rear down frame 44 is connected to a position along the associated lower rear frame 42. Each second rear down frame 46 extends obliquely downward and forward from the rear end of the associated lower rear frame 42. Each second rear down frame 46 is connected to a rear end of the main frame 22. As illustrated in FIG. 3, each reinforcement frame 48 preferably includes a first portion 48A extending upward from a location along the main frame 22; and a second portion 48B extending rearward from the first portion 48A. The second portion 48B is connected to a position along the associated second rear down frame 46. Each reinforcement frame 48 is disposed rearward relative to the engine 70. Note that the rear wheels 9 are not illustrated in FIG. 3 for the sake of clarity.

As illustrated in FIG. 1, the ROV 1 preferably includes a steering wheel 2. A steering shaft 3 is attached to the steering wheel 2. The ROV 1 preferably includes the right and left front wheels 7, and the right and left rear wheels 9. The right and left front wheels 7 are attached to an axle (not illustrated) provided on the front frame 30. The right and left rear wheels 9 are attached to an axle (not illustrated) provided on the rear frame 38. The right and left front wheels 7 are controlled by the steering wheel 2.

As illustrated in FIG. 2, the first and second seats 10L and 10R are supported by the body frame 20. More specifically, the first and second seats 10L and 10R are supported by the main frame 22. As illustrated in FIG. 1, the first seat 10L is disposed behind the steering wheel 2. As illustrated in FIG. 2, the second seat 10R is disposed rightward of the first seat 10L. The first and second seats 10L and 10R are aligned in the width direction of the vehicle. The first seat 10L preferably includes the first seat portion 14L on which an occupant sits; and a first backrest portion 18L. As illustrated in FIG. 1, the first seat portion 14L is disposed above the first portion 28A of the associated lower center frame 28. The first backrest portion 18L is disposed forward relative to the fourth portion 26D of the associated upper center frame 26. The first backrest portion 18L is disposed forward relative to the third portion 28C of the associated lower center frame 28. As illustrated in FIG. 2, the second seat 10R preferably includes a second seat portion 14R on which another occupant sits; and a second backrest portion 18R. As illustrated in FIG. 1, the second seat portion 14R is disposed above the first portion 28A of the associated lower center frame 28. The second backrest portion 18R is disposed forward rela-tive to the fourth portion 26D of the associated upper center frame 26. The second backrest portion 18R is disposed forward relative to the third portion 28C of the associated lower center frame 28.

As illustrated in FIG. 1, the ROV 1 preferably further includes a battery case 68, and a battery 69 disposed inside the battery case 68. As illustrated in FIG. 2, the battery case 68 is disposed between the first and second seats 10L and 10R. The battery 69 is disposed between the first and second seats 10L and 10R.

As illustrated in FIG. 1, the engine 70 is supported by the body frame 20. More specifically, the engine 70 is supported by the main frame 22. The engine 70 is disposed below the lower rear frames 42. As illustrated in FIG. 2, the engine 70 is disposed rearward relative to the first and second seats 10L and 10R. The engine 70 is disposed rearward relative to the first seat portion 14L of the first seat 10L, and the second seat portion 14R of the second seat 10R. A left end 70L of the engine 70 is located leftward relative to the battery 69. A right end 70R of the engine 70 is located rightward relative to the battery 69. The engine 70 is disposed on a vehicle center line M1. The term "vehicle center line" refers to a line extending in the front-rear direction of the vehicle and passing through a vehicle width midpoint between the right and left front wheels 7 (see FIG. 1) and a vehicle width midpoint between the right and left rear wheels 9 (see FIG. 1) in a plan view of the vehicle.

Figure 4:
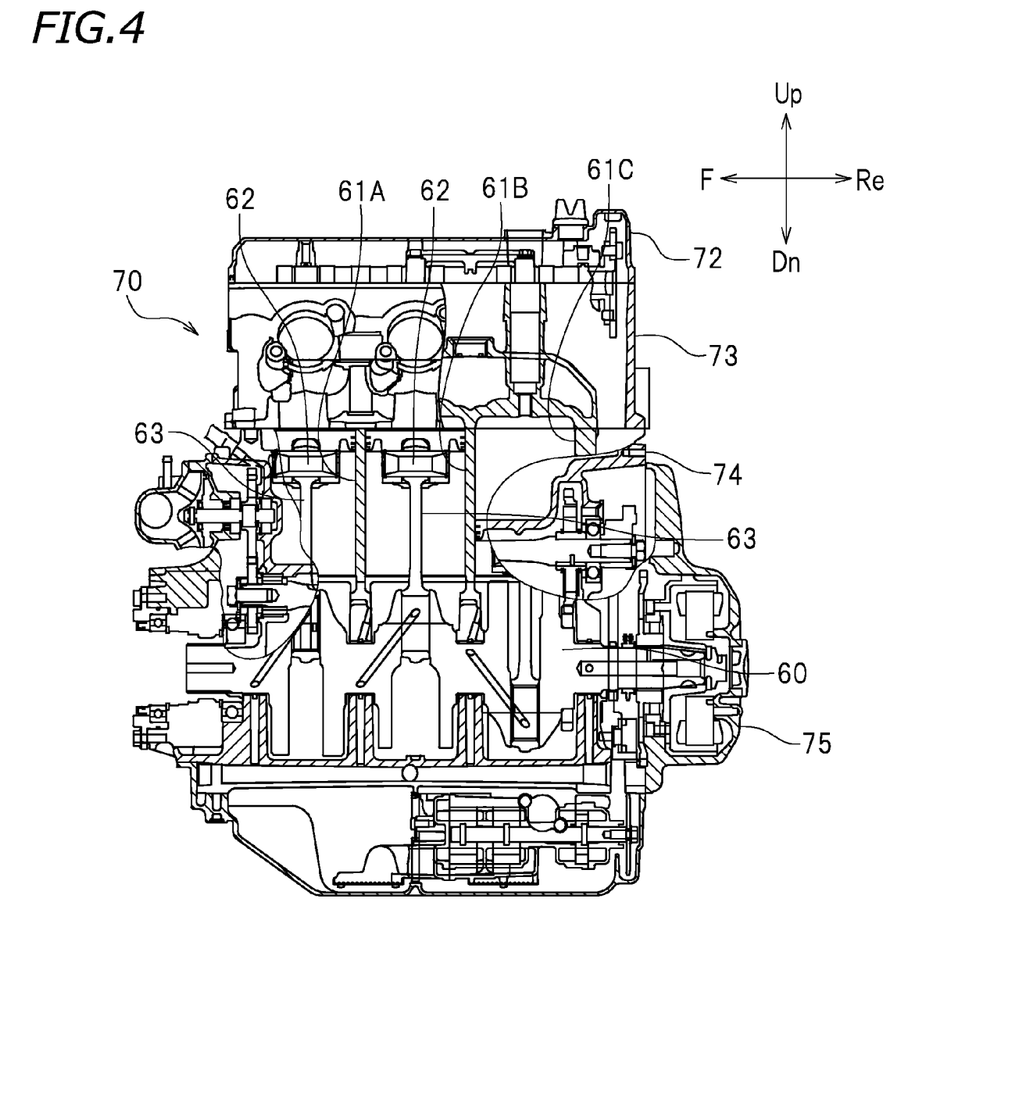
FIG. 4 is a cross-sectional view of a structure of an engine according to the first preferred embodiment of the present invention.

As illustrated in FIG. 4, the engine 70 preferably includes a crankcase 75, a cylinder body 74, a cylinder head 73, and a cylinder head cover 72. The cylinder body 74 extends upward from the crankcase 75. The cylinder head 73 is disposed on the cylinder body 74 and connected to an upper portion of the cylinder body 74. The cylinder head cover 72 is disposed on the cylinder head 73 and connected to an upper portion of the cylinder head 73.

As illustrated in FIG. 4, the engine 70 preferably includes a crankshaft 60 extending in the front-rear direction of the vehicle. The crankshaft 60 is disposed inside the crankcase 75.

As illustrated in FIG. 4, the engine 70 preferably further includes a first cylinder 61A, a second cylinder 61B, and a third cylinder 61C. The first, second, and third cylinders 61A, 61B, and 61C are provided in the cylinder body 74. The first, second, and third cylinders 61A, 61B, and 61C extend upward from a lateral portion of the crankcase 75. The first, second, and third cylinders 61A, 61B, and 61C are aligned in the front-rear direction of the vehicle. The second cylinder 61B is disposed behind the first cylinder 61A. The third cylinder 61C is disposed behind the second cylinder 61B. The engine 70 is a three cylinder engine, for example. The first, second, and third cylinders 61A, 61B, and 61C each contain a piston 62. Each piston 62 is connected to the crankshaft 60 via a connecting rod 63. Although the engine 70 according to the present preferred embodiment preferably is a three cylinder engine provided with the first, second, and third cylinders 61A, 61B, and 61C, the engine 70 may be a single cylinder engine or a multi-cylinder engine provided with two or four or more cylinders.

As illustrated in FIG. 3, the ROV 1 preferably further includes a first exhaust pipe 65 through which exhaust gas discharged from the engine 70 flows. The first exhaust pipe 65 is connected to the engine 70. The first exhaust pipe 65 preferably includes a first pipe portion 66A in communication with the first cylinder 61A (see FIG. 4); a second pipe portion 66B in communication with the second cylinder 61B (see FIG. 4); a third pipe portion 66C in communication with the third cylinder 61C (see FIG. 4); an exhaust manifold 67; and a fourth pipe portion 66D. Each of the first to third pipe portions 66A to 66C preferably includes a first section 66X extending obliquely downward and forward from the cylinder head 73; and a second section 66Y extending rearward from the first section 66X. The first, second, and third pipe portions 66A, 66B, and 66C are connected to the exhaust manifold 67. The exhaust manifold 67 is connected at its rear end with the fourth pipe portion 66D. The fourth pipe portion 66D is connected to a second exhaust pipe 102 (see FIG. 2) of the muffler unit 80, which will be described below.

As illustrated in FIG. 1, the muffler unit 80 is disposed rearward relative to the engine 70. The muffler unit 80 is disposed below the lower rear frames 42. As illustrated in FIG. 2, the muffler unit 80 is disposed rightward relative to the left end 70L of the engine 70, and leftward relative to the right end 70R of the engine 70. The muffler unit 80 is disposed rightward relative to the first seat 10L, and leftward relative to the second seat 10R. The muffler unit 80 is preferably disposed on the vehicle center line M1. As illustrated in FIG. 1, the muffler unit 80 is supported by the lower rear frames 42. As illustrated in FIG. 3, the muffler unit 80 is supported also by the reinforcement frames 48. More specifically, the muffler unit 80 is supported by the second portions 48B of the reinforcement frames 48.

Figure 5:
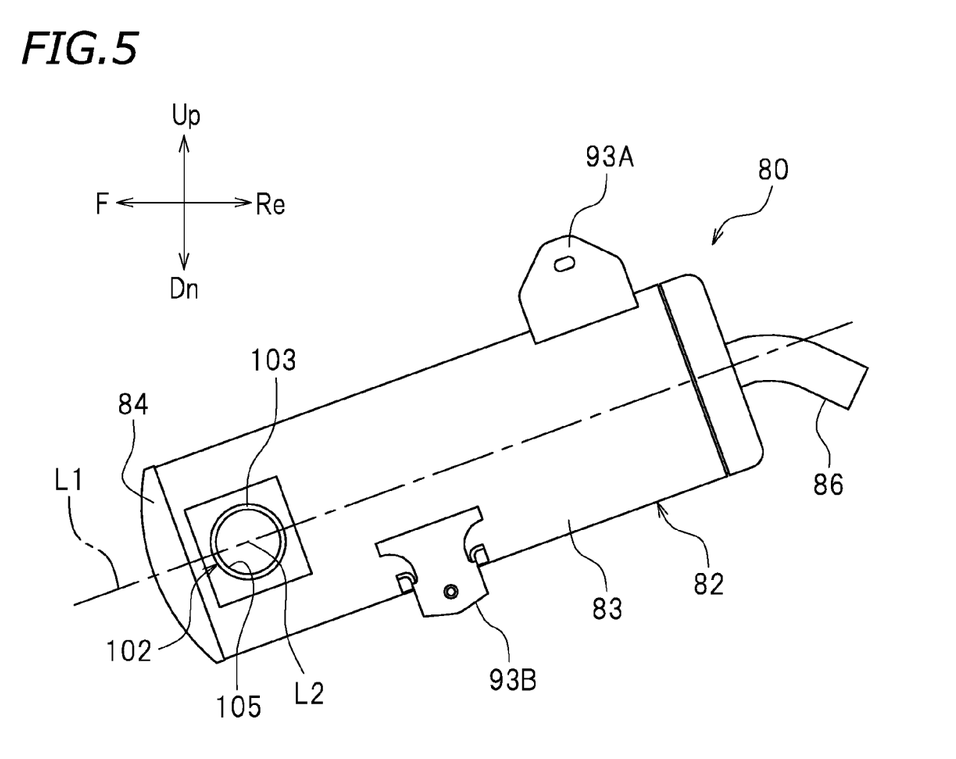
FIG. 5 is a left side view of the muffler unit according to the first preferred embodiment of the present invention.

As illustrated in FIG. 5, the muffler unit 80 includes a muffler 82 and the second exhaust pipe 102. As illustrated in FIG. 2, the muffler 82 is preferably disposed on the vehicle center line M1. As illustrated in FIG. 3, the muffler 82 is supported by the lower rear frames 42. The muffler 82 is also supported by the reinforcement frames 48.

Figure 6:
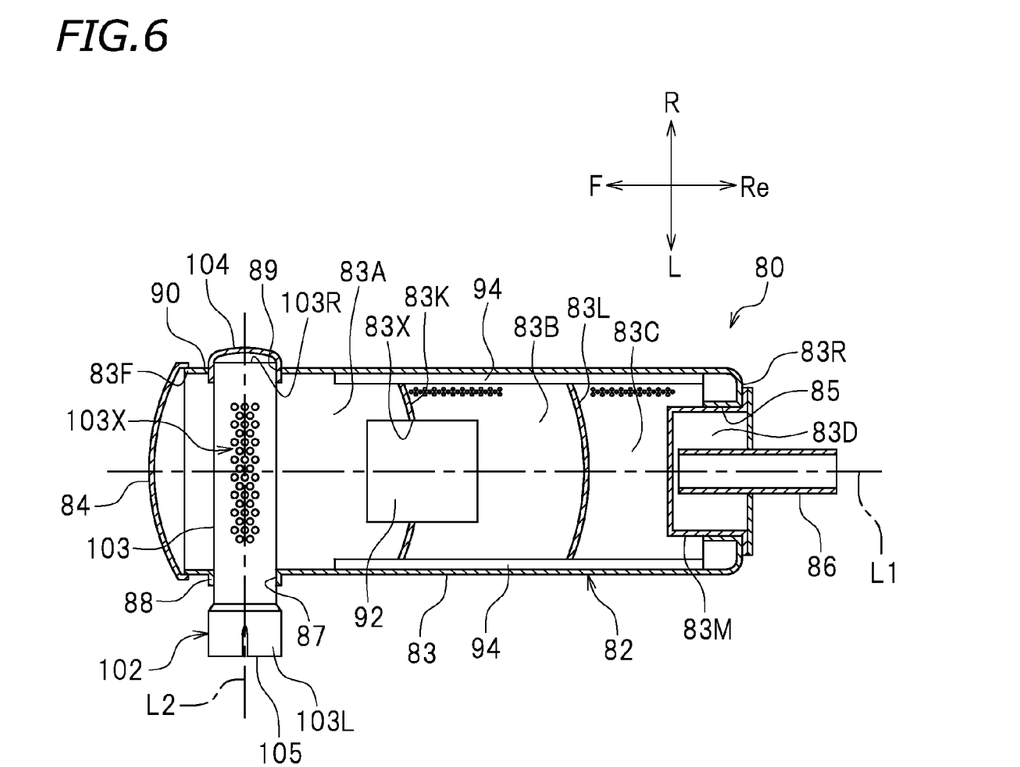
FIG. 6 is a cross-sectional view of the muffler unit according to the first preferred embodiment of the present invention.

As illustrated in FIG. 6, the muffler 82 preferably includes a first main body 83, a first lid 84, an exhaust outlet 85, a tailpipe 86, and a catalyst 92. The first main body 83 preferably has a tubular or substantially tubular shape. The first main body 83 preferably includes a first support 88 and a second support 90. The first support 88 is provided with a first opening 87 oriented in a radial direction of the first main body 83. The second support 90 is provided with a second opening 89 oriented in the radial direction of the first main body 83. The first lid 84 covers a front end 83F of the first main body 83. The exhaust outlet 85 is provided in a rear end 83R of the first main body 83. The tail pipe 86 is detachably inserted into the exhaust outlet 85. Exhaust gas that has been cleaned by the catalyst 92 flows into the tail pipe 86 through the exhaust outlet 85, and then flows out of the muffler 82.

As illustrated in FIG. 6, the first main body 83 preferably includes a first chamber 83A, a second chamber 83B, a third chamber 83C, and a fourth chamber 83D. A first partition wall 83K defines and serves as a partition between the first and second chambers 83A and 83B. The first partition wall 83K includes a through hole 83X. The catalyst 92 is disposed in the through hole 83X. A second partition wall 83L defines and serves as a partition between the second and third chambers 83B and 83C. The second partition wall 83L includes a through hole (not illustrated). A third partition wall 83M defines and serves as a partition between the third and fourth chambers 83C and 83D. The third partition wall 83M has a mesh structure. Glass wool 94 is disposed on inner walls of the first, second, and third chambers 83A, 83B, and 83C so as to absorb exhaust noise.

Figure 7:
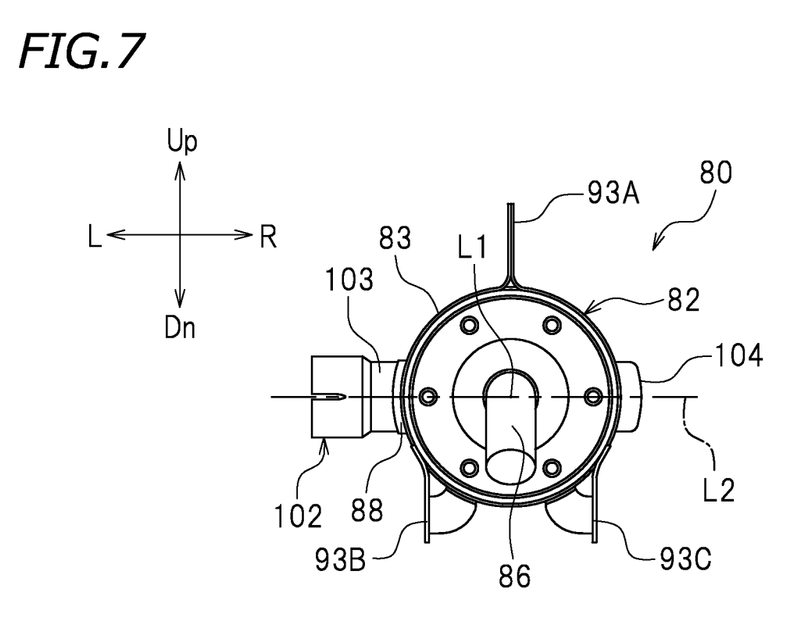
FIG. 7 is a rear view of the muffler unit according to the first preferred embodiment of the present invention.

As illustrated in FIG. 5, the first main body 83 preferably further includes a first bracket 93A, a second bracket 93B, and a third bracket 93C (see FIG. 7). The first bracket 93A is disposed above an axis L1 of the first main body 83. The first bracket 93A extends upward from the first main body 83. As illustrated in FIG. 7, the second and third brackets 93B and 93C are disposed below the axis L1 of the first main body 83. The second and third brackets 93B and 93C extend downward from the first main body 83. The second and third brackets 93B and 93C are preferably disposed symmetrically to each other. As illustrated in FIG. 3, the first bracket 93A is supported by the lower rear frames 42. More specifically, the first bracket 93A is supported by the lower rear frames 42 via brackets 42A provided on the lower rear frames 42. The second and third brackets 93B and 93C are supported by the reinforcement frames 48. More specifically, the second and third brackets 93B and 93C are supported by the reinforcement frames 48 via brackets 48E provided on the reinforcement frames 48.

As illustrated in FIG. 6, the second exhaust pipe 102 preferably includes a second main body 103, a second lid 104, and an exhaust inlet 105. The second main body 103 has a tubular or substantially tubular shape. The second main body 103 preferably has a linear shape at least between a position at which the second main body 103 is supported by the first support 88 and a position at which the second main body 103 is supported by the second support 90. The second main body 103 includes a communication port 103X through which an inner space of the first main body 83 and an inner space of the second main body 103 are in communication with each other. The communication port 103X preferably includes a plurality of holes arranged along an entire circumference of the second main body 103. Although the communication port 103X according to the present preferred embodiment preferably includes a plurality of holes, the second main body 103 may include a mesh portion and the communication port 103X may include a plurality of openings in the mesh portion.

As illustrated in FIG. 6, the second lid 104 covers a right end 103R of the second main body 103. The exhaust inlet 105 is provided in a left end 103L of the second main body 103. The exhaust inlet 105 is connected to the first exhaust pipe 65 (see FIG. 3). More specifically, the exhaust inlet 105 is connected to the fourth pipe portion 66D (see FIG. 3) of the first exhaust pipe 65.

As illustrated in FIG. 6, the second exhaust pipe 102 is inserted into the first opening 87 of the first support 88, and the second opening 89 of the second support 90. Thus, the second exhaust pipe 102 is supported by the first and second supports 88 and 90. In the present preferred embodiment, the first support 88 supports the second main body 103, and the second support 90 supports the second lid 104. Alternatively, the second support 90 may directly support the second main body 103. The second exhaust pipe 102 and the first main body 83 are preferably welded, for example, to each other at the first and second supports 88 and 90. In the present preferred embodiment, the first support 88 and the second main body 103 are welded, for example, to each other, and the second support 90 and the second lid 104 are welded, for example, to each other. Alternatively, the second support 90 and the second main body 103 may be welded to each other.

As illustrated in FIG. 6, an axis L2 of the second main body 103 extends in the width direction of the vehicle. The axis L2 of the second main body 103 extends in a horizontal or substantially horizontal direction. The axis L2 may incline with respect to the horizontal direction. The axis L2 of the second main body 103 is perpendicular or substantially perpendicular to the axis L1 of the first main body 83. Note that the axis L2 is not necessarily perpendicular or substantially perpendicular to the axis L1. As illustrated in FIG. 5, the axis L1 of the first main body 83 and the axis L2 of the second main body 103 intersect with each other. Note that the axis L1 and the axis L2 do not necessarily have to intersect with each other. For example, the second exhaust pipe 102 may be inserted into the first main body 83 so that the axis L2 is located above or below the axis L1.

As illustrated in FIG. 6, the right end 103R of the second main body 103 extends outward of the first main body 83 (i.e., rightward of the first main body 83 in the present preferred embodiment). More specifically, the right end 103R of the second main body 103 protrudes outward (i.e., rightward in the present preferred embodiment) in the radial direction of the first main body 83 through the second opening 89. The left end 103L of the second main body 103 extends outward of the first main body 83 (i.e., leftward of the first main body 83 in the present preferred embodiment). More specifically, the left end 103L of the second main body 103 protrudes outward (i.e., leftward in the present preferred embodiment) in the radial direction of the first main body 83 through the first opening 87. As illustrated in FIG. 7, a portion of the second lid 104 extends outward of the first main body 83 (i.e., rightward of the first main body 83 in the present preferred embodiment). More specifically, a portion of the second lid 104 protrudes outward (i.e., rightward in the present preferred embodiment) in the radial direction of the first main body 83 through the second opening 89 (see FIG. 6).

As illustrated in FIG. 6, the second exhaust pipe 102 of the muffler unit 80, which is connected to the first exhaust pipe 65 (see FIG. 1), is inserted into the first and second openings 87 and 89 of the first main body 83 and supported at two positions by the first and second supports 88 and 90 of the first main body 83 as described above. Thus, the second exhaust pipe 102 and the muffler 82 are fixed to each other more reliably than when the second exhaust pipe 102 is supported at one position by the first main body 83. This connection consequently reduces or prevents stress-induced distortion that occurs in the connections between the muffler 82 and the second exhaust pipe 102, i.e., in the first and second supports 88 and 90, when the muffler 82 and/or the second exhaust pipe 102 vibrate(s).

As illustrated in FIG. 6, the axis L2 of the second main body 103 according to the present preferred embodiment is preferably perpendicular or substantially perpendicular to the axis L1 of the first main body 83. This enables the first main body 83 to support the second exhaust pipe 102 in a balanced manner at the first and second supports 88 and 90.

As illustrated in FIG. 5, the axis L1 of the first main body 83 and the axis L2 of the second main body 103 according to the present preferred embodiment intersect with each other. This increases the distance between the first and second supports 88 and 90 than when the axis L1 of the first main body 83 and the axis L2 of the second main body 103 do not intersect with each other. Consequently, the second exhaust pipe 102 is more securely supported by the first main body 83.

As illustrated in FIG. 6, the right end 103R of the second main body 103 according to the present preferred embodiment extends outward of the first main body 83. This enables the first main body 83 to support the second exhaust pipe 102 more securely than when the first main body 83 supports the second exhaust pipe 102 with the right end 103R not protruding from the first main body 83 through the second opening 89.

As illustrated in FIG. 6, the communication port 103X of the second main body 103 according to the present preferred embodiment preferably includes a plurality of holes arranged along the entire circumference of the second main body 103. This allows exhaust gas flowing from the first exhaust pipe 65 (FIG. 1) to be discharged to the muffler 82 through the plurality of holes. Consequently, the muffler unit 80 effectively muffles exhaust noise.

As illustrated in FIG. 6, the second exhaust pipe 102 and the first main body 83 according to the present preferred embodiment are preferably fixed to each other at the first and second supports 88 and 90 by welds, for example. This further reinforces the connections between the second exhaust pipe 102 and the first main body 83.

As illustrated in FIG. 5, the axis L2 of the second main body 103 according to the present preferred embodiment preferably extends horizontally or substantially horizontally. The second exhaust pipe 102 is supported by the first and second supports 88 and 90 that are disposed symmetrically with respect to the axis L1 of the first main body 83. Thus, upon application of a vertically downward load to the muffler 82, equal or substantially equal loads are applied to the first and second supports 88 and 90. Consequently, the load applied to one of the first and second supports 88 and 90 is prevented from being greater than the load applied to the other of the first and second supports 88 and 90.

As illustrated in FIGS. 1 and 3, the muffler unit 80 according to the present preferred embodiment is supported by the lower rear frames 42 and the reinforcement frames 48. This causes the muffler unit 80 to receive vibrations from the lower rear frames 42 and the reinforcement frames 48. To cope with such vibrations, the second exhaust pipe 102 is supported at two positions by the first and second supports 88 and 90 of the first main body 83 as illustrated in FIG. 6. This reduces or prevents stress-induced distortion that occurs in the connections between the muffler 82 and the second exhaust pipe 102 due to the vibrations.

As illustrated in FIG. 6, the axis L2 of the second main body 103 according to the present preferred embodiment extends in the width direction of the vehicle. The second exhaust pipe 102 is supported by the first and second supports 88 and 90 that are disposed symmetrically with respect to the axis L1 of the first main body 83. Thus, upon application of a vertically downward load to the muffler 82, equal or substantially equal loads are applied to the first and second supports 88 and 90. Consequently, the load applied to one of the first and second supports 88 and 90 is prevented from being greater than the load applied to the other of the first and second supports 88 and 90. Because the axis L1 of the first main body 83 is located on the vehicle center line M1, no moment is applied to the muffler 82 in the width direction of the vehicle.

As illustrated in FIG. 2, the muffler unit 80 according to the present preferred embodiment is preferably disposed rearward relative to the engine 70, leftward relative to the right end 70R of the engine 70, and rightward relative to the left end 70L of the engine 70. Thus, the muffler unit 80 is disposed compactly.

As illustrated in FIG. 2, the muffler unit 80 according to the present preferred embodiment is preferably disposed rightward relative to the first seat 10L, and leftward relative to the second seat 10R. Thus, the muffler unit 80 is compact. The axis L1 of the first main body 83 is preferably located on the vehicle center line M1, so that the muffler unit 80 is disposed substantially in a widthwise center of the vehicle. This more effectively reduces or prevents moment-induced distortion that occurs in the first and second supports 88 and 90, for example, during vibration of the ROV 1 than when the muffler unit 80 is offset rightward or leftward in the width direction of the vehicle.

Second Preferred Embodiment

Figure 8:
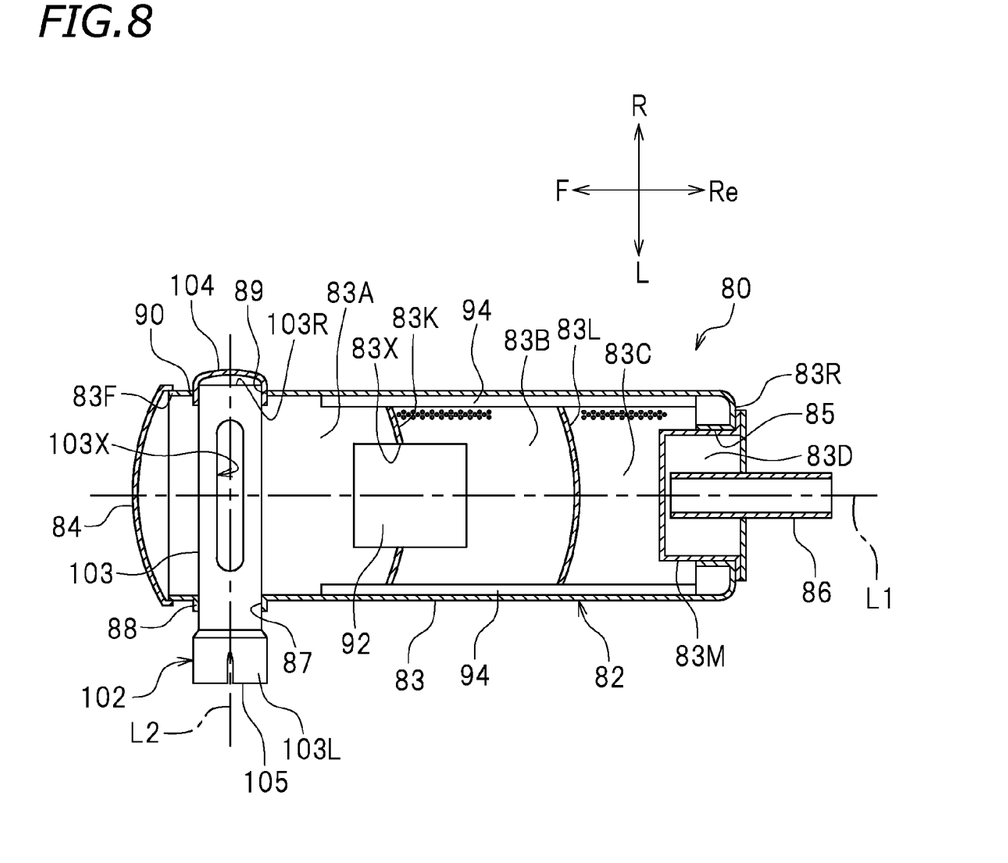
FIG. 8 is a cross-sectional view of a muffler unit according to a second preferred embodiment of the present invention.

FIG. 8 is a cross-sectional view of a structure of the muffler unit 80 according to a second preferred embodiment of the present invention. As illustrated in FIG. 8, the second main body 103 includes the communication port 103X through which the inner space of the first main body 83 and the inner space of the second main body 103 are in communication with each other. The communication port 103X preferably has an oblong or substantially oblong shape. The communication port 103X extends along the axis L2 of the second main body 103. The exhaust outlet 85 and the communication port 103X are oriented in different directions. In the present preferred embodiment, the communication port 103X is located in upper and lower portions of the second main body 103. The communication port 103X is not limited to an oblong or substantially oblong shape but may have a rectangular or elliptical or substantially rectangular or elliptical shape, for example.

As illustrated in FIG. 8, the exhaust outlet 85 and the oblong communication port 103X according to the present preferred embodiment are oriented in different directions. The communication port 103X has an oblong or substantially oblong shape and thus allows exhaust gas to flow efficiently from the second exhaust pipe 102 to the muffler 82. Furthermore, a flow passage through which the exhaust gas flows is increased in length because the exhaust outlet 85 and the communication port 103X are oriented in different directions. Consequently, the muffler unit 80 effectively muffles exhaust noise.

The terms and expressions which have been used herein are used as terms of description and not of limitation, and there is no intention, in the use of such terms and expressions, of excluding any equivalents of the features shown and described or portions thereof, but it is recognized that various modifications are possible within the scope of the present invention claimed. While the present invention may be embodied in many different forms, a number of illustrative embodiments are described herein with the understanding that the present disclosure is to be considered as providing examples of the principles of the present invention and that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A vehicle comprising:
a body frame;
a first seat supported by the body frame;
a second seat supported by the body frame, the second seat disposed rightward of the first seat;
an engine supported by the body frame, the engine disposed rearward relative to the first seat and the second seat;
a first exhaust pipe through which exhaust gas discharged from the engine flows; and a muffler unit supported by the body frame, the muffler unit including a muffler and a second exhaust pipe, the muffler extending lengthwise in a front-rear direction of the vehicle; wherein the muffler includes:
- a first main body having a tubular or substantially tubular shape and including a first support provided with a first opening, the first opening being oriented in a radial direction of the first main body;
- a first lid covering a first end of the first main body; and
- an exhaust outlet at a second end of the first main body;

the second exhaust pipe includes:
- a second main body having a tubular or substantially tubular shape; and
- an exhaust inlet connected to the first exhaust pipe;

the second exhaust pipe extends into the first opening and is supported by the first support;

the second main body includes a communication port through which an inner space of the first main body and an inner space of the second main body are in communication with each other;

the body frame includes a center frame, a front frame disposed in front of the center frame, and a rear frame disposed behind the center frame;

the muffler is supported by the rear frame; and a rear end of the muffler is disposed frontward relative to a rear end of the rear frame.

2. The vehicle according to claim 1, wherein an axis of the second main body extends in a width direction of the vehicle.

3. The vehicle according to claim 1, wherein the muffler unit is disposed rearward relative to the engine, leftward relative to a right end of the engine, and rightward relative to a left end of the engine.

4. The vehicle according to claim 1, wherein
the muffler unit is disposed rightward relative to the first seat and leftward relative to the second seat.

5. The vehicle according to claim 1, wherein the muffler includes a front portion and a rear portion, and the muffler is inclined such that a highest point of the rear portion is higher than any point of the front portion.

6. The vehicle according to claim 1, wherein the rear frame includes upper rear frames extending obliquely downward and rearward from the center frame, lower rear frames extending rearward from the center frame, and rear down frames extending obliquely downward and forward from the rear end of the lower rear frames.

7. The vehicle according to claim 6, wherein the muffler is supported by the lower rear frames.

8. The vehicle according to claim 6, wherein the muffler is disposed frontward relative to the rear down frames.

9. A vehicle comprising:
- a body frame;
- a first seat supported by the body frame;
- a second seat supported by the body frame, the second seat disposed rightward of the first seat;
- an engine supported by the body frame, the engine disposed rearward relative to the first seat and the second seat;
- a first exhaust pipe through which exhaust gas discharged from the engine flows; and
- a muffler unit supported by the body frame, the muffler unit including a muffler and a second exhaust pipe, the muffler extending lengthwise in a front-rear direction of the vehicle; wherein the muffler includes:
- a first main body having a tubular or substantially tubular shape and including a first support provided with a first opening, the first opening being oriented in a radial direction of the first main body;
- a first lid covering a first end of the first main body; and
- an exhaust outlet at a second end of the first main body;

the second exhaust pipe includes:
- a second main body having a tubular or substantially tubular shape; and
- an exhaust inlet connected to the first exhaust pipe;

the second exhaust pipe extends into the first opening and is supported by the first support;

the second main body includes a communication port through which an inner space of the first main body and an inner space of the second main body are in communication with each other; and the engine includes a crankshaft extending in the front-rear direction of the vehicle.

* * * * *